Aug. 31, 1954
M. JACOBS
2,687,905
PIPE COUPLING WITH CAM DISENGAGEABLE
PIVOTED DETENT MEANS THEREFOR
Filed July 26, 1952
2 Sheets-Sheet 1
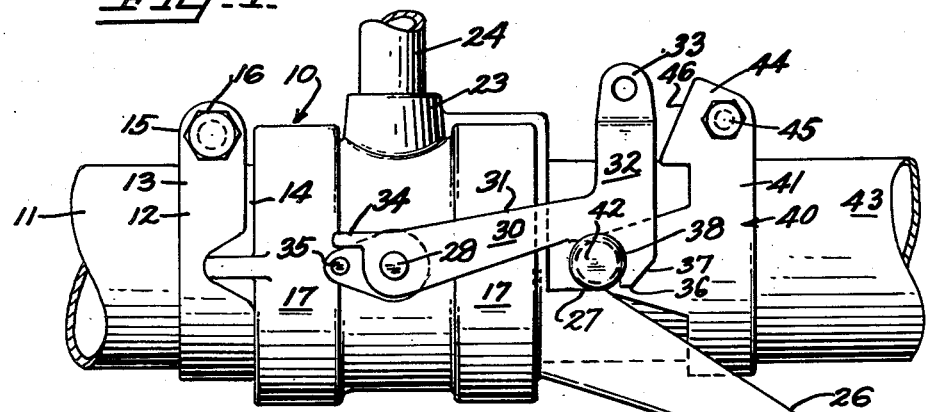
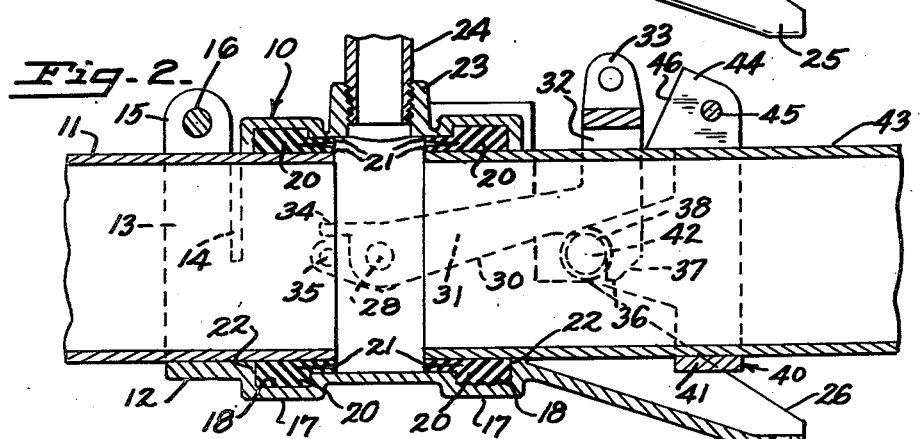
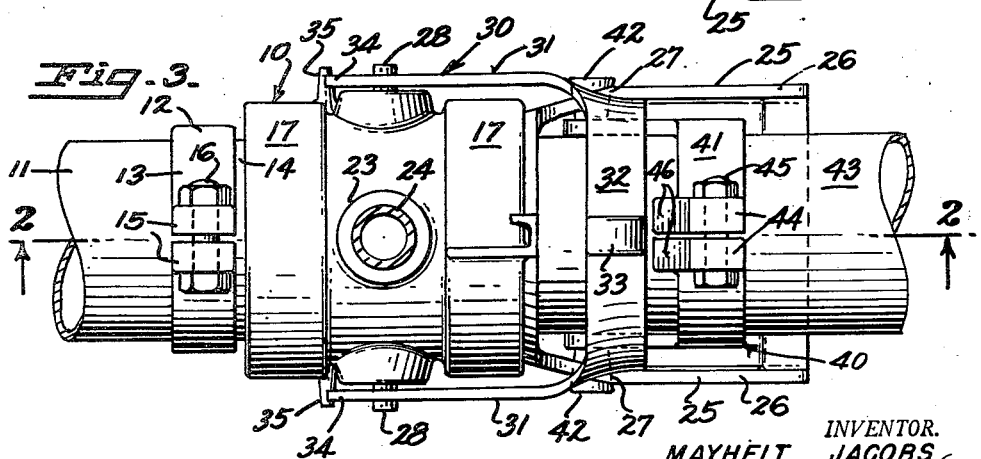
INVENTOR.
MAYHELT JACOBS
BY
ATTORNEY

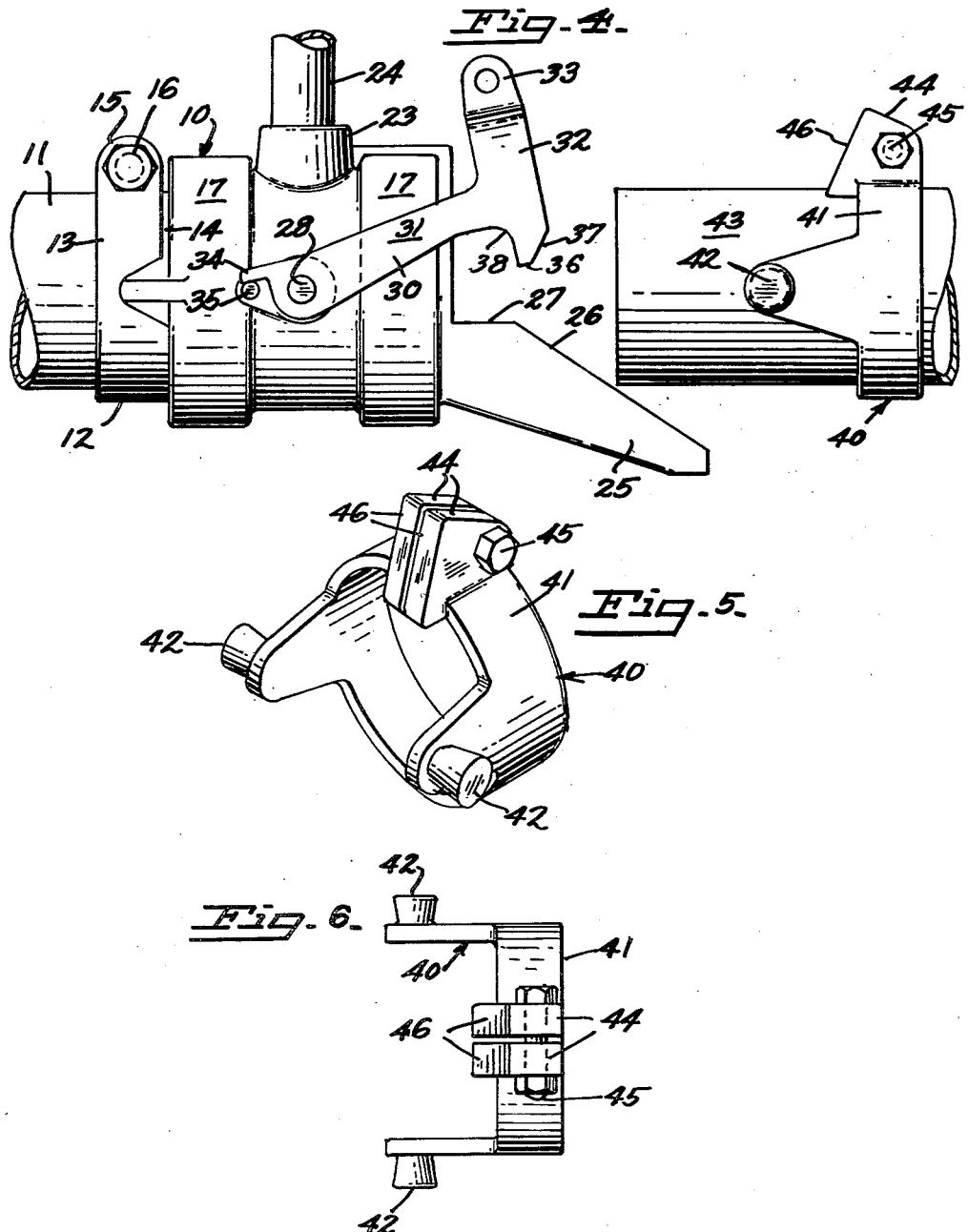

Patented Aug. 31, 1954

2,687,905

UNITED STATES PATENT OFFICE 2,687,905

PIPE COUPLING WITH CAM DISENGAGE-
ABLE PIVOTED DETENT MEANS THERE-
FOR

Mayhelt Jacobs, Piedmont, Calif., assignor to Pacific Pipe Company, San Francisco, Calif., a corporation of California Application July 26, 1952, Serial No. 301,110

6 Claims. (Cl. 285—172)

This invention relates to an improved quick-acting coupling for joining two sections of pipe together.

The present invention is particularly useful with portable irrigation pipe, because it solves the problem of quick coupling and uncoupling of pipe sections. By means of this invention, a line of pipe can be quickly disassembled, the sections moved to another location, and the pipe line quickly reassembled there. An important feature of the invention is that any two sections of pipe can be joined together and separated from each other without the workman touching the coupling or even being near to it. Moreover, the quick-action coupling will not accidentally become uncoupled.

Some objects of the invention, therefore, are to provide a pipe coupling which can be put together very quickly and taken apart quickly without in either case touching the coupling itself; to provide a coupling member which can stand considerable pressure without coming apart; and to provide a coupling which lengthens the life of the pipe, due to the fact that either half can be removed and placed on a fresh-cut section of the pipe or on a new piece of pipe when the end of the pipe becomes bent and misshapen.

Other objects and advantages of the invention will be found from the following description of a preferred embodiment presented in accordance with United States Revised Statutes, section 4888. Changes may be made in the precise structure without affecting the invention and, therefore, it is to be understood that the scope of the invention is defined by the appended claims and that these are not to be narrowly limited to the particular embodiment described.

In the drawings:

Fig. 1 is a view in side elevation of a coupling-fitting embodying the principles of this invention shown attached at the ends of two sections of pipe.

Fig. 2 is a view similar to Fig. 1 with the parts shown in section, taken along the line 2—2 of Fig. 3.

Fig. 3 is a top plan view of the coupling shown in Fig. 1.

Fig. 4 is a view of the coupling shown in Fig. 1 with the members uncoupled.

Fig. 5 is a view in perspective of the male coupling member.

Fig. 6 is a top plan view of the male coupling member.

In general the invention comprises a coupling made up of a pair of fittings, one male, the other female, attached to the opposite ends of a pipe section. The female coupling member includes a guide rim, for positioning studs that are on the male member, and a pivoted latch, which is temporarily displaced by the studs during the coupling operation and subsequently falls back down behind the studs and locks the members together so that they will not come apart accidentally. The male member also includes a latch opening member that lifts the latch when the pipes are pushed toward each other and makes it possible, by proper operation, to uncouple the pipes without touching either coupling member.

The form of the invention shown in the drawings is a type suitable for use in a sprinkler irrigation system. Usually a main stationary line along the edge of a field is equipped with a number of hydrant outlets and valves, to any one or more of which may be attached portable lateral lines having a series of sprinklers. The portable pipe may be made in sections about twenty feet long and adapted to be joined together by the coupling herein described. Preferably the pipe, the fitting and all of the other parts are made of cast or machined aluminum because its light weight enhances the portability of the pipe, although they may be made from other materials without affecting the operation or structure of the coupling.

According to the preference of the farmer, the female coupling member 10 may or may not be fitted with a sprinkler outlet. The female member 10 may be made as a straight sleeve, as shown, or it may be made as an elbow, T, Y, or adapter. The end of the last pipe in the line may be left open, but where pressure lines branch off along the pipe it is normally closed on the end by a plug. Pressures up to 500 lbs. per square inch are sometimes put on the pipe line, and the couplings have to withstand this pressure without bursting or leaking. The coupling shown is constructed to withstand these pressures.

The female coupling member 10 comprises a sleeve removably secured adjacent one end of a pipe section 11 by a collar 12 that is made integral with the sleeve 10 but has its upper half 13 separated from the rest of the sleeve 10 by a gap 14. The upper end of the collar 12 is split into two lugs 15, and a bolt 16 joins the lugs 15 and clamps the collar 12 tightly around the pipe 11, thereby holding the sleeve 10 firmly in position. One advantage of this structure is that no openings need be drilled in the pipe 11, and that no gaskets are therefore needed to prevent leaks through such attachment openings.

Adjacent the ends of the sleeve 10 are annular bosses 17, each of which is recessed to provide an annular inside groove 18, in which fits an annular gasket 20 (see Fig. 2). Preferably each ring gasket 20 is made of rubber or synthetic rubber and has split, V-shaped flanges forming lips 21 which face in toward the center of the sleeve 10. Normally the lips 21 engage the outside diameter of the pipes and the inside diameter of the sleeve 10. When water flows through the sleeve 10, the fluid pressure bears against the lips 21 and seals them tightly against the pipes and the sleeve. The greater the water pressure, the tighter the sealing pressure is on the lips 21. A rib 22, around the axially outer side of each groove 18, protects the gaskets 20 from injury incident to the insertion and removal of the pipes 11 and 43 in the coupling member 10.

The form of sleeve 10 shown in the drawings includes a riser outlet 23 in which a nipple 24 or sprinkler head may be threaded. When not in use a plug can be threaded into the opening. This outlet 23 is not necessary to the invention and many fittings are made without it. However, it is shown to illustrate how the water is conducted to sprinklers with the ends of the two pipe sections 11 and 43 spaced apart so the water may pass between them into the sprinkler pipe 24.

The outer end of the sleeve 10 (right hand end in Figs. 1 to 4) comprises the female portion of the severable coupling. Preferably the upper portion of the sleeve is cut away and the lower portion is flared to provide a lip 25 which is adapted to receive and to guide the incoming male pipe. The inclined upper faces 26 of the lip 25 guide the studs 42 on the male member onto the flat surface 27 where they are held when the pipe sections are coupled together.

A pair of pivot bearings 28 spaced axially from and in line with the position occupied by the studs 42 when the coupling is locked together, support a latch member 30 which comprises two arms 31 joined by a semi-circular strip portion 32. The latch 30 may have a small perforated handle 33 at the top.

Two stop members 34 project from the ends of the arms 31 (adjacent the bearings 28) and limit the upward swing of the latch 30 by engaging two cooperating stop members 35 projecting from the sleeve 10 just back of and axially in line with the bearings 28. These stops 34, 35 prevent the latch 30 from being moved too far out of position and also prevent damage to the latch during transit.

Adjacent the juncture of the arms 31 and the half-circle strip 32 are depending detents 36. The forward edge 37 of each detent is tapered so that when the male end of the pipe is inserted, the studs 42 push against them and the latch 30 is lifted enough to permit the studs to slide behind the detents 36. The inner surface 38 of each detent 36 is curved to prevent movement of the studs 62, except when the latch 30 and the detents 36 are lifted.

The male coupling member 40 (see Figs. 4–6) comprises a ring 41 having two integral studs 42 projecting outwardly therefrom. The ring 41 is secured adjacent the end of the succeeding pipe section 43 by means of a pair of lugs 44, through which a bolt 45 passes to clamp the ring 41 together around the pipe 43. Again, no drilling of the pipe 43 is necessary to attach the coupling 40.

An important feature of the present invention is the cammed forward edge 46 of the lugs 44. The edge 46 is inclined at about 25° to normal (65° with respect to the horizontal). Also it is spaced with relation to the studs 42 and the latch portion 32 so that, after the studs 42 are locked behind the detents 36, a smart forward movement of the pipe 43 toward the pipe 11 will cause the edge 46 to engage the latch 30 and jolt or bounce it upwardly so that it travels partway up the inclined edge 46 and then up away from it. In this manner, the latch 30 is lifted enough so that if the pipe 43 is immediately pulled back away from the pipe 11, the studs 42 will be withdrawn past the detents 36 before the latch 30 falls down and prevents its withdrawal. In this manner, the pipe can be completely uncoupled without having to touch the latch 30 or either coupling member 10 or 40.

Preferably the studs 42 are flared or tapered outwardly from the pipe, so that in the direction of the pull on the coupling the angle is less than a right angle with respect to the axis of the pipe. The purpose of this is to prevent the studs from spreading the detents 36 and releasing the coupling when the water pressure builds up and tends to force the pipes apart. By having the studs tapered, the cam action on the latch portions 38 puts an inward rather than an outward thrust on them so they won't stretch apart.

When two pipes having the above male and female members are to be joined together, all that need be done is to lay the end of the pipe 43 having the male coupling member 40 on the lip 25 of the female member 10. Then the male pipe 43 is moved axially into the sleeve 10. The studs 42 slide along the inclined upper faces 26 of the lip 25 and onto the flat shelves 27. As they slide, the studs 42 lift the latch 30 high enough to slide past the detents 36, and then the latch 30 falls and supports the detents 36 adjacent the studs 42. When water flows through the sleeve 10 the fluid pressure tends to spread apart the lips 21 of the gaskets 20 and prevents any leakage. Water may flow up through the space between the pipes 11 and 43 into the nipple 23 and to any outlet connected to it.

To separate two connected pipes 11 and 43 the latch 30 must be lifted. This may be accomplished by raising the handle 33 or by placing the finger under the collar 32 and holding it up until the studs 42 have been retracted beyond the detents 36. However, one of the main advantages of the present invention is the provision of the cammed members 46 by which the coupling can be unjoined without touching the latch 30. Simply by pushing the pipe 43 toward the pipe 11 and then withdrawing it quickly, the latch 30 will be lifted long enough to permit the studs 42 to be pulled past the detents 36. The movement should be a quick one, so that the detents 36 do not have time to fall back into their normal position. If one quick in-and-out jerk does not uncouple the pipe, a short series of jiggles will usually do so.

It will be seen that the present invention enables rapid coupling and uncoupling of successive pipe sections and that, when coupled, the joint is leak tight.

Around a farm or other place where this pipe is used it is not handled with too much care. It is moved from field to field and is dumped off trucks or carts at intervals prior to being coupled. Other farm implements bump against it and in time the end section of either pipe may become misshapen. The pipe then becomes difficult or impossible to couple together in a good leak-tight fit and it is discarded. However, when the pipe 43, equipped with the coupling 40 of the present invention, has a damaged end, all the farmer has to do is to cut off the damaged portion, loosen the bolt 45, slide the ring 41 back on the pipe 43 so that the freshly cut end of the pipe 43 is exposed, and then retighten the bolt 45. The male coupling end is as good as new and the only loss is a few inches of the pipe.

The same thing is true with regard to the female coupling member 10, which can be relocated on a freshly cut end of the pipe 11 or on a new pipe by loosening the bolt 16, sliding the sleeve 10 to its desired position, and then retightening the bolt 16. Thus another advantage of the present invention is that the farmer can himself replace any pipe sections and apply the coupling parts to new pipe.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A coupler for joining together successive sections of pipe, said coupler including in combination a male coupler ring clamped around one of said pipe sections, said ring having two studs projecting radially outwardly from said pipe section; a female coupler on the other said pipe section having a projecting lip adapted to support said studs; a swingable latch member pivotally secured to said female coupler adjacent said lip and having a pair of latching detents adapted to swing down over said studs and prevent their retraction; and a cam member on said ring adapted when said male coupler is moved toward said female coupler to engage said latch member and to lift it, so that upon a quick backward movement said studs can be withdrawn beyond said detent, whereby said coupler may be uncoupled without having to touch it.

2. A coupler for joining together successive sections of pipe, including in combination a male coupler ring secured to one said pipe section, said ring having a pair of outwardly projecting studs; a female coupler on the other said pipe section, having a forward edge adapted to support said studs; a swingable latch member pivotally secured to said female coupler adjacent said lip and having a pair of latching detents adapted to swing down along said studs and prevent their retraction; and a cam member on said ring adapted when said male coupler is moved toward said female coupler to engage said latch member and to lift it so that upon a quick backward movement said studs can be withdrawn beyond said detent, therefore uncoupling said coupler without having to touch it.

3. A coupler for joining together successive sections of pipe and including in combination a male coupler ring clamped around one of said pipe sections, said ring having radially outwardly projecting studs; a female coupler on the other said pipe section having means for supporting said studs; a swingable latch member pivotally secured to said female coupler adjacent said lip and having latching detents adapted to swing down adjacent said studs and prevent their retraction when the pipe has been coupled; and means on said ring adapted when said male coupler is moved toward said female coupler to engage said latch member and to lift it, so that upon a quick backward movement said studs can be withdrawn beyond said detent.

4. A coupler for joining together successive sections of pipe including in combination a male coupler on one of said sections, said coupler comprising a split ring having a pair of lugs projecting upward therefrom and bolted together so as to clamp said ring around its said pipe section, said ring also having two studs projecting radially outwardly from said ring; a female coupler on the other said section, said female coupler comprising a sleeve with its inner end partially split to provide a collar portion whose lower half is continuous with and integral with the remainder of said sleeve and whose upper portion is split and is provided with a pair of lugs bolted together so as to clamp said sleeve around its said pipe section, said sleeve having a projecting lower lip adapted to receive said male section, the upper edges of said lip forming a guide for said studs and a portion continuous therewith upon which said studs rest when said coupler is latched together; a swingable latch member pivotally secured to said sleeve axially in line with the studs when they are in their latched position and having a latching detent on each side adapted to swing down over its adjacent stud and prevent retraction of said studs from said slot; and cam means on the lugs of said male ring, adapted, when said two pipe sections are forced toward each other while said pipe is in its coupled position, to engage said latch member and raise it so that said coupler may be uncoupled by following the raising with a sharp backward action, said latch member normally being bounced upwardly by a sharp engagement with said cammed edge so that there is sufficient time to retract said studs before retraction is prevented by said detents.

5. A coupler for joining together successive sections of pipe including in combination a male coupler on one of said sections, said coupler comprising a split ring having a pair of lugs projecting upward therefrom at the split and bolted together so as to clamp said ring around its said pipe section, said lugs having a cam surface facing the adjacent pipe end, said ring also having two diametrically-opposite flared studs projecting radially outwardly from said ring; a female coupler on the other said section, the end of said sleeve facing away from its adjacent pipe end being partially separated to provide a collar whose lower half is continuous with and integral with said sleeve and whose upper portion is split and is provided with a pair of lugs at the split adapted to be bolted together so as to clamp said sleeve around its said pipe section, said sleeve having a projecting lower lip adapted to receive said male section, the upper edges of said lip forming an inclined guide for said studs which terminates in a horizontal portion upon which said studs rest when said coupler is latched together; and a swingable latch member pivotally secured to said sleeve axially in line with the studs when they are in their latched position and having a latching detent on each side adapted to swing down over its adjacent stud and prevent retraction of said studs from said slot; the said cam edge on the lugs of said male ring being adapted, when said two pipe sections are forced toward each other while coupled together, to engage said latch member and raise it so that said coupler may be uncoupled by following the raising with a sharp backward action, said latch member normally being bounced upwardly by a sharp engagement with said cam edge so that there is sufficient time to retract said studs before retraction is prevented by said detents.

6. A coupler for joining adjacent ends of a pair of pipe sections, comprising a split ring supported on one of said sections adjacent an end thereof and having a pair of studs projecting diametrically outwardly therefrom; a cylindrical female coupling member supported on the other pipe section with an end thereof projecting beyond the end of the last named section and adapted to receive the end of the first section together with the coupling member thereon, said female coupling member having a pair of diametrically disposed and axially-extending stud-receiving edges and a generally arcuate extension projecting beyond the upper edge of said cylindrical member and having inclined edges leading out from said stud receiving edge and aligned therewith so as to provide a means for guiding said studs into place; a swingable latch member including a pair of arms disposed on opposite sides of said similar coupling member and having corresponding ends thereof pivoted to the female coupling member on an axis extending diametrically thereof and parallel to the axis of said studs; a stud engaging detent carried on the other end of each of said arms; a semicylindrical member joining said arms around the upper half of said sleeve; and a projecting member on said male ring for engaging said semicylindrical joining member of said latch and, when said coupling members are sharply urged together, to cause said latch to be jolted upwardly carrying said detents out of their latching position long enough to permit withdrawal of said studs therefrom.

References Cited in the file of this patent

UNITED STATES PATENTS

| Number | Name | Date |
|---|---|---|
| 2,470,539 | Wyss | May 17, 1949 |
| 2,473,283 | Guenther | June 14, 1949 |
| 2,526,754 | Johnson et al. | Oct. 24, 1950 |